(12) United States Patent
Danielson et al.

(10) Patent No.: US 10,041,616 B2
(45) Date of Patent: Aug. 7, 2018

(54) WIDE TOLERANCE FLUID CONNECTOR

(71) Applicant: FASTEST, INC., Roseville, MN (US)

(72) Inventors: Robert Danielson, Ham Lake, MN (US); Scott Allan Gulden, Saint Michael, MN (US)

(73) Assignee: FASTEST, INC., Roseville, MN (US)

( * ) Notice: Subject to any disclaimer, the term of this patent is extended or adjusted under 35 U.S.C. 154(b) by 207 days.

(21) Appl. No.: 15/061,144

(22) Filed: Mar. 4, 2016

(65) Prior Publication Data

US 2016/0258563 A1  Sep. 8, 2016

Related U.S. Application Data

(60) Provisional application No. 62/128,109, filed on Mar. 4, 2015.

(51) Int. Cl.
  *F16L 37/08* (2006.01)
  *F16L 25/14* (2006.01)
  *F16L 37/084* (2006.01)

(52) U.S. Cl.
  CPC .......... *F16L 25/14* (2013.01); *F16L 37/0847* (2013.01)

(58) Field of Classification Search
  CPC . F16L 37/0847; F16L 37/096; F16L 37/0982; F16L 37/127; F16L 25/14
  USPC ........................................................ 285/322
  See application file for complete search history.

(56) References Cited

U.S. PATENT DOCUMENTS

| | | | |
|---|---|---|---|
| 4,049,297 A | 9/1977 | Reneau | |
| 4,447,077 A | 5/1984 | Palmer | |
| 4,884,830 A | 12/1989 | Meisinger | |
| 5,209,528 A * | 5/1993 | Weh ...................... | F16L 37/121 285/315 |
| 7,857,361 B1 * | 12/2010 | Hanser .................. | F16L 37/138 285/322 |
| 8,844,979 B2 * | 9/2014 | Danielson ............. | F16L 37/121 285/322 |
| 2005/0167981 A1 | 8/2005 | Nuttall et al. | |
| 2013/0200607 A1 | 8/2013 | Rodenberg et al. | |

OTHER PUBLICATIONS

International Search Report and Written Opinion for PCT/US2016/020885, dated May 11, 2016, 24 pages.

* cited by examiner

*Primary Examiner* — David Bochna
(74) *Attorney, Agent, or Firm* — Hamre, Schumann, Mueller & Larson, P.C.

(57) ABSTRACT

A fluid connector that is designed to work with a wide range of tube configurations and sizes by being able to adjust to the configuration and size of tube being connected to. The fluid connector can also include a pressure driven actuation resistance mechanism to achieve higher pressures. Therefore, a single fluid connector can be used over a wide range of applications. This permits the creation of a standardized cost effective fluid connector design.

15 Claims, 11 Drawing Sheets

WIDE TOLERANCE FLUID CONNECTOR

FIELD

This disclosure relates to a fluid connector that can be used to, for example, connect a first fluid system with a second fluid system for transferring fluids, including gaseous or liquid fluids, between the first and second fluid systems, or for sealing a fluid system using the fluid connector.

BACKGROUND

An example of a fluid connector relating to this disclosure is described in U.S. Pat. No. 5,209,528. As described in this patent, collets are arranged to close around a tube under control of a retractable sleeve. The collets are not designed to put significant gripping pressure on the outside of the tube. Instead, the collets are designed to wedge between the tube and the sleeve, with a feature on the tube, such as a bead, barb, threads or the like, held by the collets. When the sleeve is in a locked position, the sleeve slides over the collets and holds the collets in a collapsed position around the tube. When the sleeve is pulled backward to a retracted position against the biasing force of a spring, the collets are biased open by a biasing spring. Due to the construction of the collets and an internal piston within the fluid connector, the collets prevent the sleeve from being biased back to the locked position until such time as an end of the tube is inserted into the connector and the piston is pushed backward. Therefore, when the fluid connector is not connected to a tube, the collets are held open ready to receive the end of the tube, and the collets hold the sleeve back at the retracted position.

The type of fluid connector described in U.S. Pat. No. 5,209,528 is designed to work with a specific tube size having a specific configuration such as a bump, bead, barb, flare or the like. If one tries to connect to a tube having a larger or smaller diameter, or having a different configuration, the fluid connector will not attach or incorrectly attach to the tube permitting separation of the tube from the fluid connector during use. As a result, this type of fluid connector tends to be custom made for each tube configuration and size, so that a number of fluid connectors need to be produced for the various anticipated tube configurations and sizes to be encountered. Due to the custom manufacturing, these types of fluid connectors are expensive to manufacture, have long lead times to produce, and do not allow for variations in the parts forming the fluid connectors. In addition, often times the tolerance of the tubes to be attached to this type of fluid connector can vary greatly, the tubes are not within specification, the tubes are out of round, or there is other variation in the tube configuration or size, thereby preventing use of the fluid connector or rendering use of the fluid connector ineffective.

SUMMARY

A fluid connector is described herein that is designed to work with a wide range of tube configurations (such as a bump, bead, barb, flare or the like to be held by the collets) and tube sizes by being able to self-adjust to the configuration and size of tube being connected to. Therefore, a single fluid connector can be used over a wide range of applications. This permits the creation of so-called standard, off-the-shelf fluid connectors, instead of being custom made, permitting the fluid connector to be made in volume, which reduces costs and production lead times.

In the fluid connector described herein, the interface between the collets and the sleeve is modified to achieve a desired range of motion of the collets to collapse around the different tube configurations and diameters. In one embodiment, the collets (or the sleeve) have a relatively shallow angle surface, while the inner surface of the sleeve (or the outer surface of the collets) has multiple step diameters. In addition, because of the interface between the collets and the sleeve, the sleeve is always biased to return to a default or locked position up and over the collets holding the collets in the collapsed position, even when a tube is not inserted into the end of the fluid connector.

In an optional embodiment, to help prevent the sleeve from being pushed backward by fluid pressure to a retracted position against the bias of the spring, a pressure driven actuation resistance mechanism can be provided. The pressure driven actuation resistance mechanism generates an actuation resistance force on the sleeve when the fluid connector is under pressure, with the amount of actuation resistance force varying based on the pressure of the fluid internal to the fluid connector. As the fluid pressure increases, more force is exerted on the collets which push outward against the sleeve tending to push the sleeve open to the retracted position. However, as the fluid pressure increases, the actuation resistance force generated by the pressure driven actuation resistance mechanism on the sleeve is increased thereby counteracting the force of the collets on the sleeve. Likewise, as the fluid pressure decreases, the actuation resistance force generated by the pressure driven actuation resistance mechanism on the sleeve is also decreased. In one embodiment, the pressure driven actuation resistance mechanism can include a ball.

In addition, the main seal used in the fluid connector described herein has a construction that permits the main seal to seal with a range of tubes and tube shapes.

DRAWINGS

DETAILED DESCRIPTION

Figure 1:
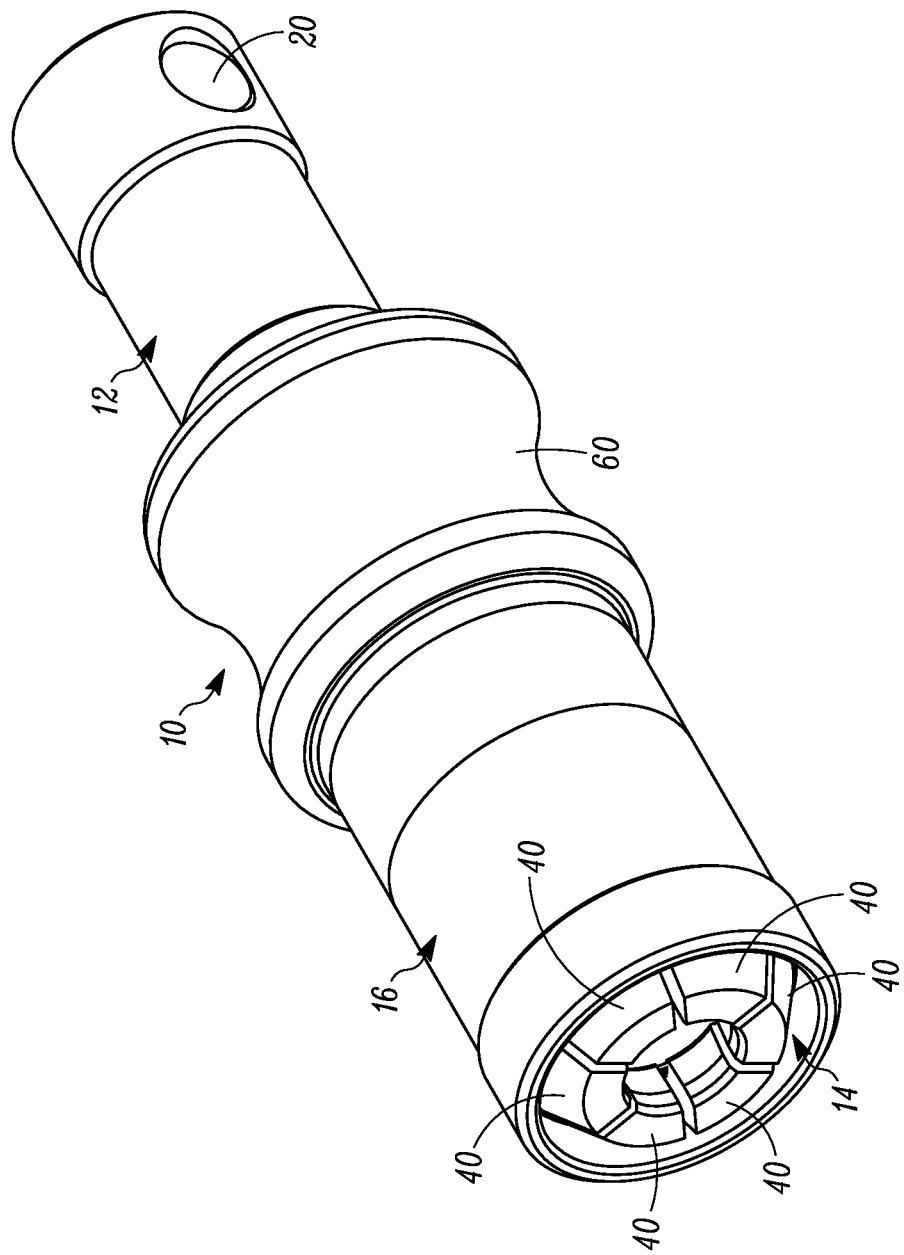
FIG. 1 is a perspective view of a fluid connector described herein.

With reference initially to FIG. 1, an embodiment of a fluid connector 10 is illustrated. In this example, the fluid connector 10 is a generally cylindrical construction that includes a body 12, a collet assembly 14, a sleeve 16, and a piston 18 (visible in FIGS. 2-3). The fluid connector 10 can be used to, for example, connect a first fluid system with a second fluid system for transferring fluids, including gaseous or liquid fluids, between the first and second fluid systems, or the fluid connector 10 can connect to a fluid system for sealing the fluid system using the fluid connector 10.

In one embodiment, the fluid connector 10 can be integrally, but removably connected to the first fluid system via a fluid opening 20 formed in the body 12. In other embodiments, the fluid system to which the fluid connector 10 is integrally connected to can be considered the second fluid system. In use of the fluid connector 10, the fluid connector 10 is designed to detachably connect to a tube 22 (visible in FIG. 4) of the second fluid system (or of the first fluid system if the fluid connector 10 is integrally connected to the second fluid system). When the fluid connector 10 connects to the tube 12, fluid can be directed between the first and second fluid systems through the fluid connector 10.

Figure 2:
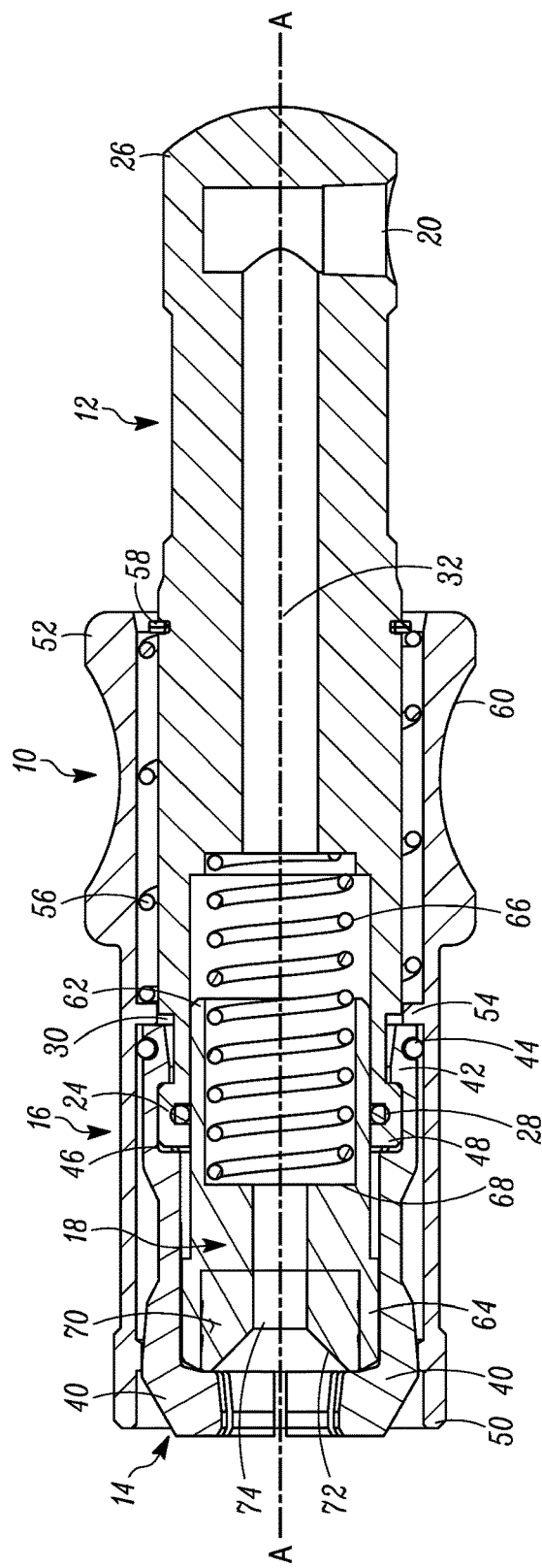
FIG. 2 is a longitudinal cross-sectional view of the fluid connector of FIG. 1 with the sleeve in a default or locked position.
Figure 3:
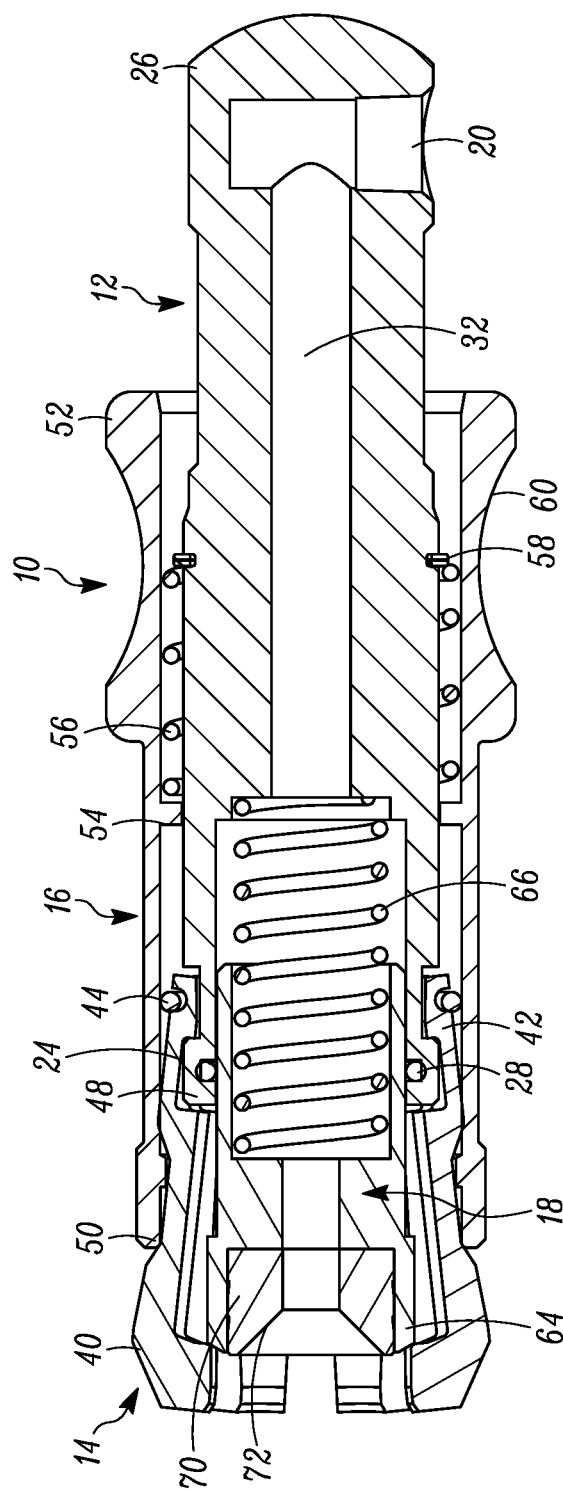
FIG. 3 is a longitudinal cross-sectional view similar to FIG. 2 but with the sleeve in a retracted position.

Referring now to FIGS. 1-3, the body 12 is a generally elongated structure having a first or front end 24 and a second or rear end 26. At or near the first end 24, the body 12 includes a radially inward facing channel in which a piston seal 28 is disposed. The piston seal 28 seals with an exterior surface of the piston 18 to prevent leakage of fluid between the piston 18 and the body 12. To the rear of the front end 24, a radial outward facing circumferential channel 30 is formed in the body 12. The channel 30 is designed to receive rear ends of collets 40 of the collet assembly 14 as discussed further below.

A fluid flow channel 32 is formed through the body 12 from the first end 24 to the second end 26, with the fluid flow channel 32 in fluid communication with the fluid opening 20 which is located at or near the second end 26. In the illustrated embodiment, the fluid opening 20 extends radially outward in the body 12 and in use can receive a fluid fitting that directs fluid into or from the body 12 via the fluid opening 20. However, the fluid opening 20 can have other configurations as well, such as extending at an angle in the body 12 or extending axially through the second end 26. In some embodiments, the fluid opening 20 could be plugged if the fluid connector 10 is used to seal a fluid system.

With continued reference to FIGS. 1-3, the collet assembly 14 comprises a plurality of collets 40 that are circumferentially arranged side-by-side around a central longitudinal axis A-A of the fluid connector 10. A rear end 42 of each collet 40 is disposed in the channel 30 on the body 12, and a suitable spring 44, for example a garter spring or elastomeric material, is disposed in a channel formed in the rear end 42 of each collet 40. Each collet 40 includes a radial inward channel 46 that receives an enlarged boss 48 formed at or near the first end 24 of the body 12. The spring 44 applies a radially inward biasing force to the collets 40 that tends to force the collets 40 to pivot about the boss 48 from a collapsed or closed position (shown in FIG. 2) to an expanded or open position (shown in FIG. 3) when the sleeve 16 is pulled axially backward from a default or locking position (shown in FIG. 2) to a retracted position (shown in FIG. 3) as discussed further below.

The sleeve 16 is slidably disposed on the body 12 and on the collet assembly 14 for axial sliding movement in the direction of the longitudinal axis A-A. The sleeve 16 includes a front end 50 and a rear end 52. The sleeve 16 includes a radially inward projecting shoulder 54 on the interior thereof that can slide on an outer surface of the body 12. The shoulder 54 also forms a surface against which one end of a sleeve spring 56, for example a coil spring, can abut for biasing the sleeve 16 toward the default position shown in FIG. 2. The other end of the sleeve spring 56 abuts against a retaining ring 58 that is secured to the outer surface of the body 12. As also shown in FIG. 2, the shoulder 54 of the sleeve 16 can also abut against the rear ends 42 of the collets 40.

The sleeve 16 can be manually retracted by a user from the default position shown in FIG. 2 to the position shown in FIG. 3. When the sleeve 16 is released, and the tube 22 is not inserted into the fluid connector 10, the sleeve spring 56 biases the sleeve 16 so that the sleeve 16 automatically returns back to the default position shown in FIG. 2. At the default position, the sleeve 16 is up and over the collets 40 holding the collets 40 at their most collapsed position. The sleeve 16 can also be formed with one or more suitable grip enhancement features 60 that aid a user in retracting the sleeve 16. For example, as illustrated in FIGS. 1 and 2, the grip enhancement feature 60 can comprise an enlarged section of the sleeve 16 at or near the rear end 52 thereof formed with a circumferential concavity that aids a user's hand in gripping the sleeve 16 when pulling back on the sleeve 16 and perhaps even when pushing the sleeve 16 forward toward the default position.

A rear end 62 of the piston 18 is disposed within the first end 24 of the body 12 and a front end 64 of the piston 18 projects beyond the body 12. The piston 18 forms a fluid flow channel that is a continuation of the fluid flow channel 32 of the body 12 so that fluid can flow through the piston 18. The piston 18 is slideable within the body 12 relative to the body 12 in the direction of the longitudinal axis A-A. A biasing spring 66, for example a coil spring, is engaged at one end with the body 12 and is engaged at an opposite end thereof with a shoulder 68 formed within the piston 18. The biasing spring 66 biases the piston 18 in a direction away from the body 12 (or to the left in FIG. 2), but permits the piston 18 to be pushed backward against the bias of the spring 66 further into the body 12.

A main seal 70 is disposed within the front end 64 of the piston 18 so that the main seal 70 is movable with the piston 18. The main seal 70 is positioned and configured to seal with an end of the tube 22 when the tube 22 is inserted into the fluid connector 10. In one embodiment, the main seal 70 is configured to permit it to seal with a plurality of sizes and configurations of tube ends. For example, as illustrated in FIG. 2, the main seal 70 can have an inverted cone shape with an inwardly and rearwardly sloping sealing surface 72. The sealing surface 72 permits the main seal 70 to seal with different sizes of the tube ends, as well as tube ends of different configurations. The main seal 70 also has a passage 74 that aligns with the fluid flow channel through the piston 18 and the fluid flow channel 32 in the body 12 to form a continuous fluid flow passage through the fluid connector 10.

Figure 4:
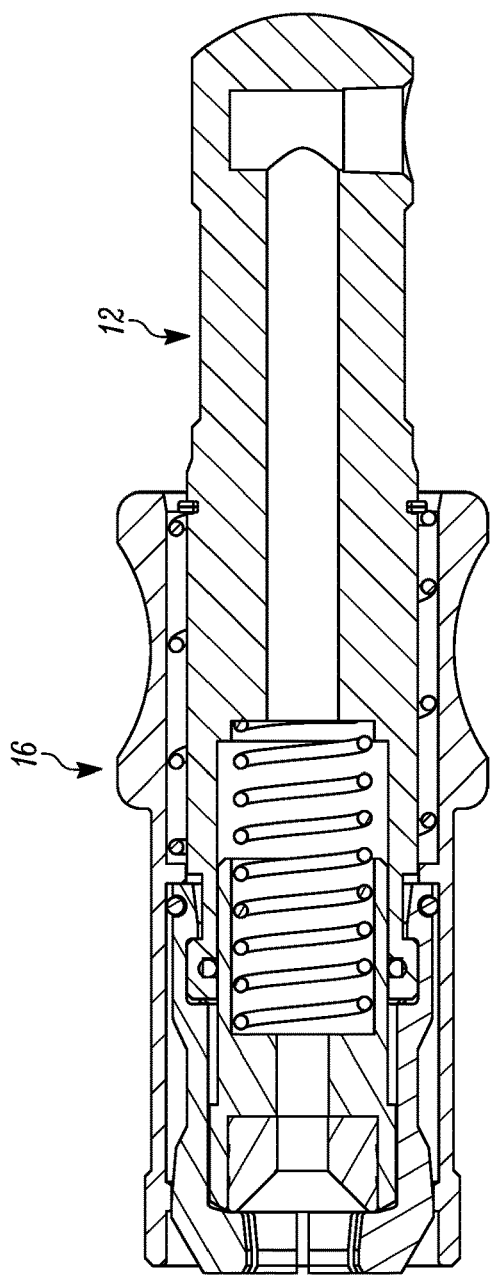
FIG. 4 is a longitudinal cross-sectional view similar to FIG. 2 prior to connection to a tube.
Figure 4:
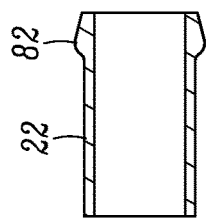
Figure 5:
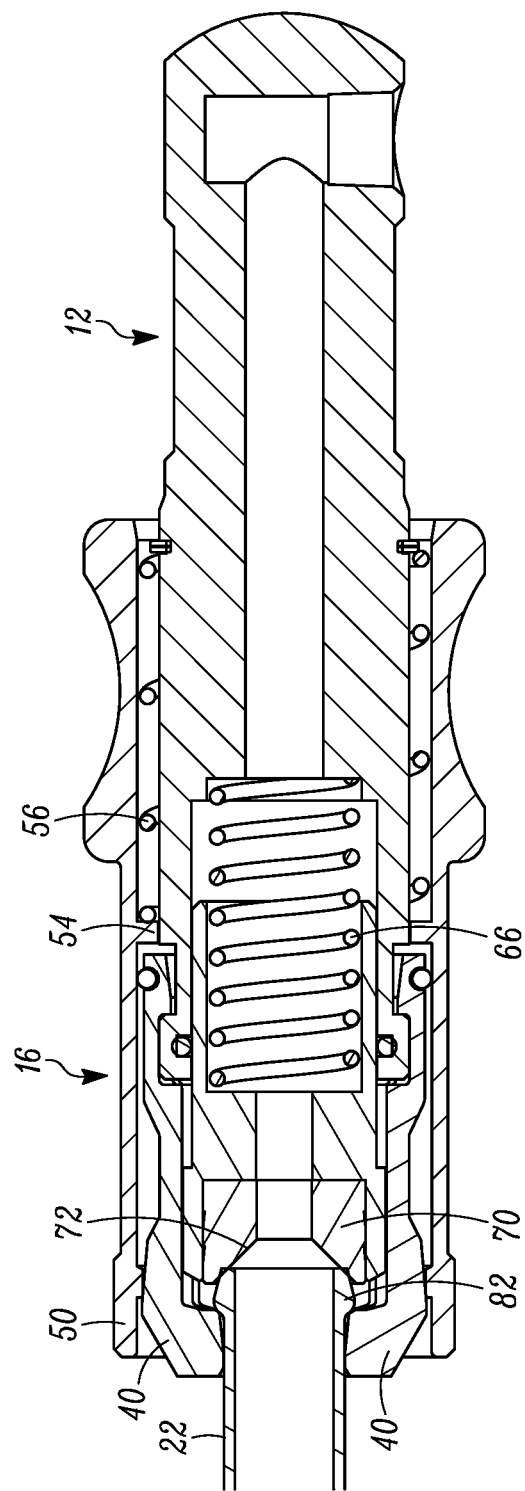
FIG. 5 is a longitudinal cross-sectional view similar to FIG. 4 with the fluid connector connected to the tube.

The fluid connector 10 described so far operates generally as follows. The tube 22, or other structure the fluid connector 10 is to attach to, has a configuration that includes one or more protruding features 82 to permit the collets 40 to hold the tube 22 or other structure. Examples of protruding features 82 can include, but are not limited to, a bead, barb, threads or the like. With reference to FIGS. 3-5, to attach to the tube 22, a user manually retracts the sleeve 16 to the retracted position shown in FIG. 3. This permits the collets 40 to expand outwardly due to the biasing force of the spring 44. The end of the tube 22 is then inserted into the end of the fluid connector 10 through the opening formed by the expanded collets 40. The end of the tube 22 engages the angled surface 72 of the main seal 70 and the piston 18 is pushed backward against the force of the spring 66. The user then releases the sleeve 16 which is biased by the spring 56 back toward the default position. As the sleeve 16 travels toward the default position, the inner surface of the sleeve 16 at the front end 50 thereof rides up and over the outer surfaces of the collets 40, forcing the collets 40 to pivot radially inwardly to collapse around the tube 22 (FIG. 5). As seen in FIG. 5, the collets 40 latch just beyond the protruding feature 82 of the tube 22 to connect the fluid connector 10 to the tube 22 without applying significant gripping pressure on the tube 22. In this type of connector, the collets 40 provide a radial force on the tube 22 but they do not provide a gripping force.

Figure 6:
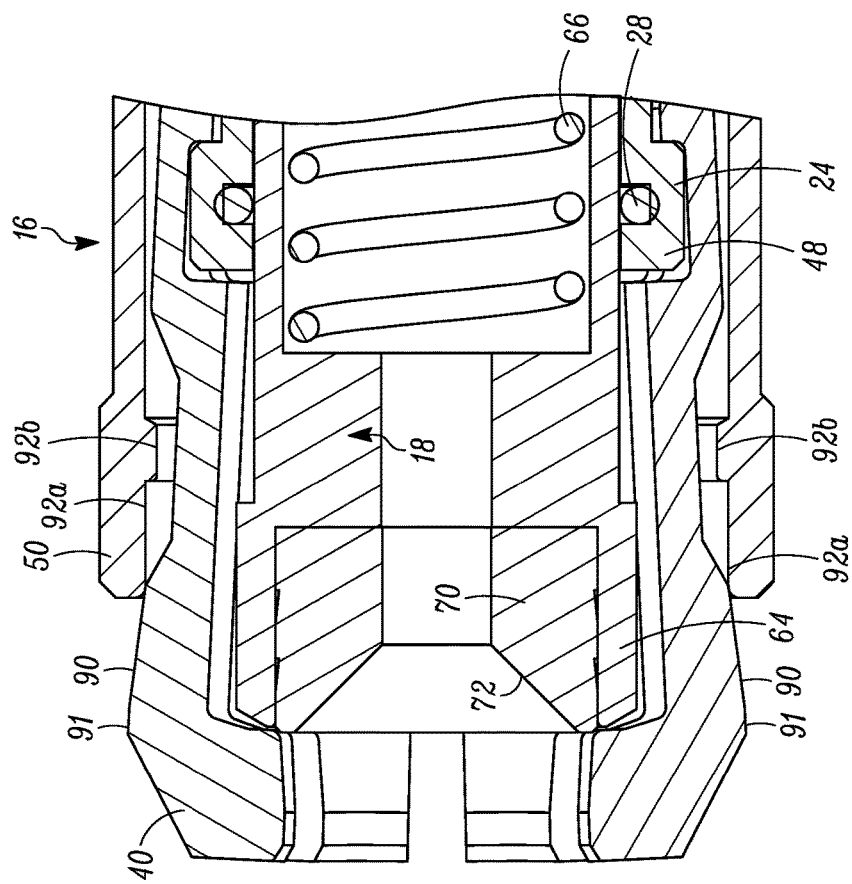
FIG. 6 is a cross-sectional view of a portion of the front end of the fluid connector detailing an example of an interface between the sleeve and the collets, and with the sleeve retracted and the collets expanded to an open position.
Figure 7:
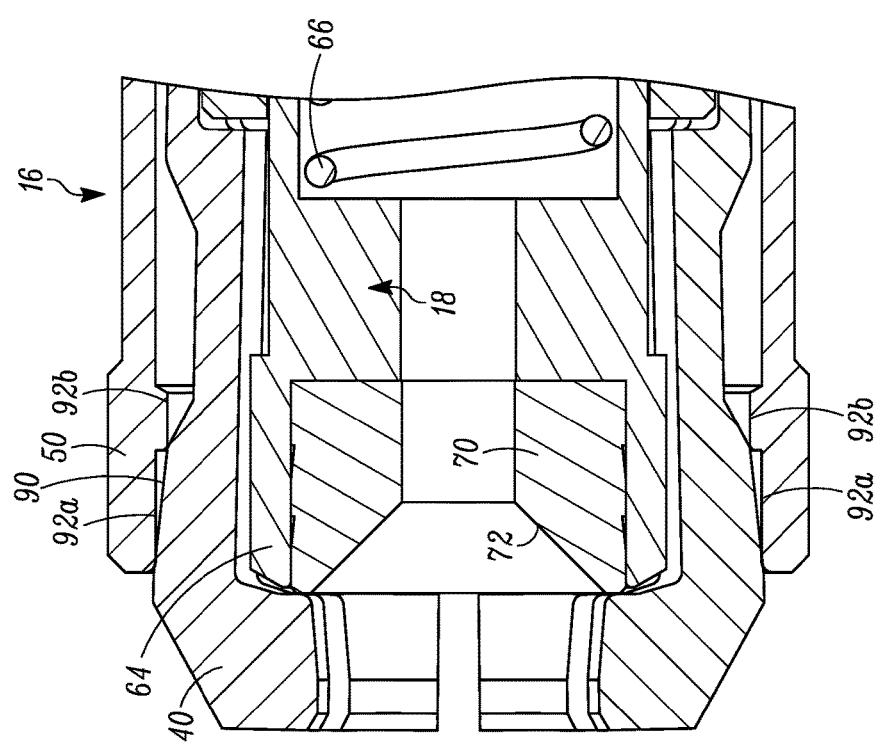
FIG. 7 is a cross-sectional view similar to FIG. 6 with the sleeve at one engaged position on the collet surface to collapse the collets to grip a tube having a larger diameter.
Figure 8:
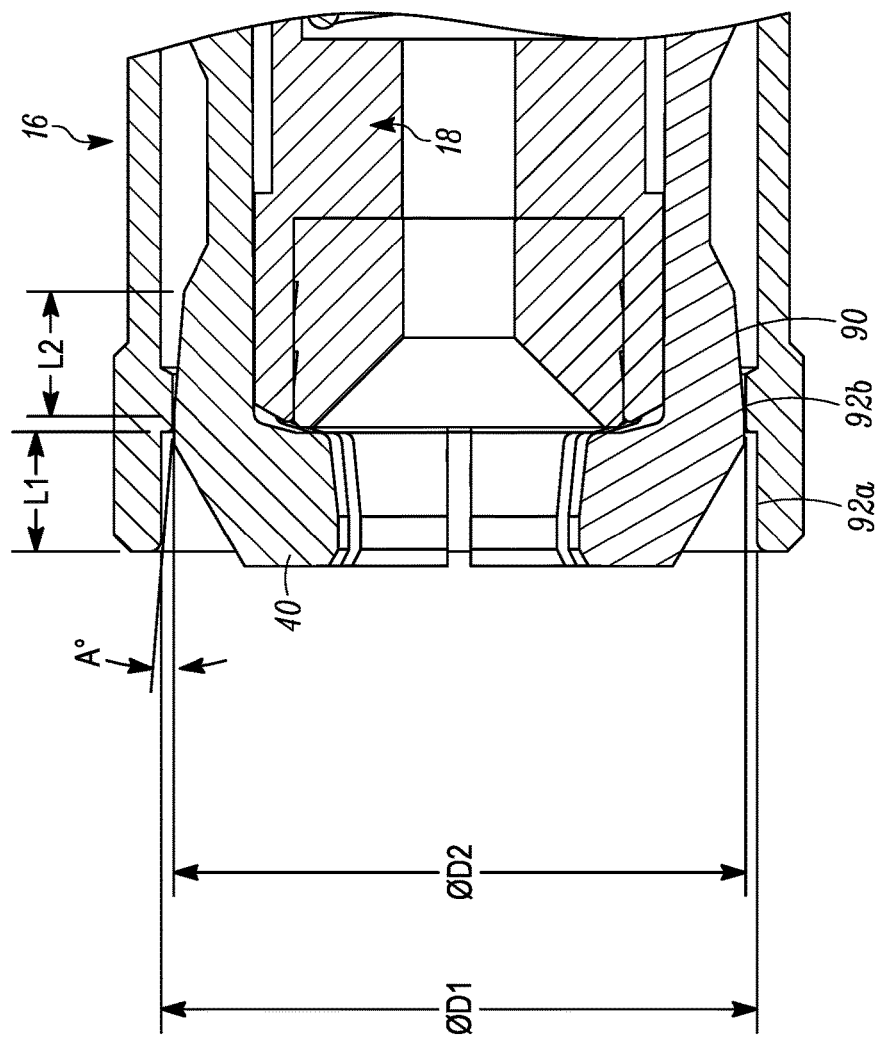
FIG. 8 is a cross-sectional view similar to FIG. 6 with the sleeve at another engaged position on the collet surface to collapse the collets to grip a tube having a smaller diameter.

Referring now to FIGS. 6-8, the interface between the exterior surface of the collets 40 and the interior surface of the sleeve 16 at the front end 50 is configured to permit the collets 40 to self-adjust to different diameters and configurations of the tube 22 when the collets 40 are collapsed by the sleeve 16, allowing the fluid connector 10 to connect to tubes having different tube configurations and diameters. In particular, in the embodiment illustrated in FIGS. 6-8, each collet 40 is provided with a relatively shallow angled exterior surface 90 that extends to a flat 91, while the interior surface of the sleeve 16 at the front end 50 is provided with two or more actuation surfaces or steps 92a, 92b having different inside diameters.

The actuation surfaces 92a, 92b are intended to engage on the angled exterior surfaces 90 of the collets 40 and collapse the collets 40 radially inward as the sleeve 16 is forced toward the default position by the spring 56 depending upon the diameter of the tube 22 being connected to. The angled collet surfaces 90 and the actuation surfaces 92a, 92b are sized and position relative to one another so that the actuation surfaces 92a, 92b will cause different amounts of inward movement of the collets 40 based on the diameter of the tube 22 being connected to. For example, as the sleeve 16 is biased back toward the default position, the actuation surface 92a will initially engage the angled surfaces 90 of the collets 40 forcing the collets 40 to begin collapsing around the tube 22 as shown in FIG. 6. The actuation surface 92a of the sleeve 16 continues to travel along the angled surfaces 90 forcing the collets 40 further radially inward. As the actuating surface 92a nears the end of the surfaces 90, the smaller diameter actuation surface 92b begins engaging the angled surfaces 90 of the collets 40 as shown in FIG. 7. Because the actuation surface 92b has a smaller inner diameter than the actuation surface 92a, the actuation surface 92b forces the collets 40 to collapse even further radially inwardly.

However, depending upon the diameter of the tube 22 being gripped, the tube 22 will control the amount of inward collapse of the collets 40, which determines whether one or both of the actuation surfaces 92a, 92b engage the collet surfaces 90, and how far along the angled collet surfaces 90 the actuation surfaces 92a, 92b travel. If the tube 22 is at the minimum diameter of the intended size range, the sleeve actuation surface 92b will slide over the flats 91 of the collets 40.

With reference to FIG. 8, the geometry between the angled collet surfaces 90 and the actuation surfaces 92a, 92b is chosen to permit the above-described self-adjustment of the collets 40 to different diameters and configurations of the tube 22. For example, the angled collet surfaces 90 have an angle A relative to horizontal and relative to the longitudinal axis A-A. The larger the angle A is, more force is created during use of the fluid connector 10 that pushes back on the sleeve 16 trying to open the fluid connector 10 as fluid pressure increases. The smaller the angle A is, the less movement of the collets 40, i.e. the range of motion of the collets 40 is lowered, which limits the self-adjustment of the collets 40. In one embodiment, the angle A can range from about 4 degrees to about 10 degrees. In another embodiment, the angle A can range from about 5 degrees to about 7 degrees. In another embodiment, the angle A can be about 5 degrees. In the illustrated example in FIG. 8, ØD1 is the inside diameter of the sleeve 16 for the actuation surface 92a, ØD2 is the inside diameter of the sleeve 16 for the actuation surface 92b, L1 is the length of the actuation surface 92a, and L2 is the length of each angled collet surface 90. In one embodiment, L1 and L2 can be the same length.

The angle A creates a frictional force between the collet surfaces 90 and the actuation surfaces 92a, 92b. That frictional force, together with the biasing force of the sleeve spring 56, creates a force that resists the push back force acting on the sleeve 16 that tends to open the fluid connector 10. In one embodiment, the frictional force created by the angle A together with the biasing force of the sleeve spring 56 is equal to or greater than the push back force that is created when the angle A is about 4 degrees to about 10 degrees. Optionally, in some embodiments, a pressure driven actuation resistance mechanism described further below can be used to help supplement the combination of frictional force created by the angle A together with the biasing force of the sleeve spring 56.

In one embodiment, the geometry between the angled collet surfaces 90 and the actuation surfaces 92a, 92b can be chosen to permit the fluid connector 10 to grip and seal with tubes having diameters over a diametrical range of about Ø0.100 (or about 2.54 mm).

Figure 9:
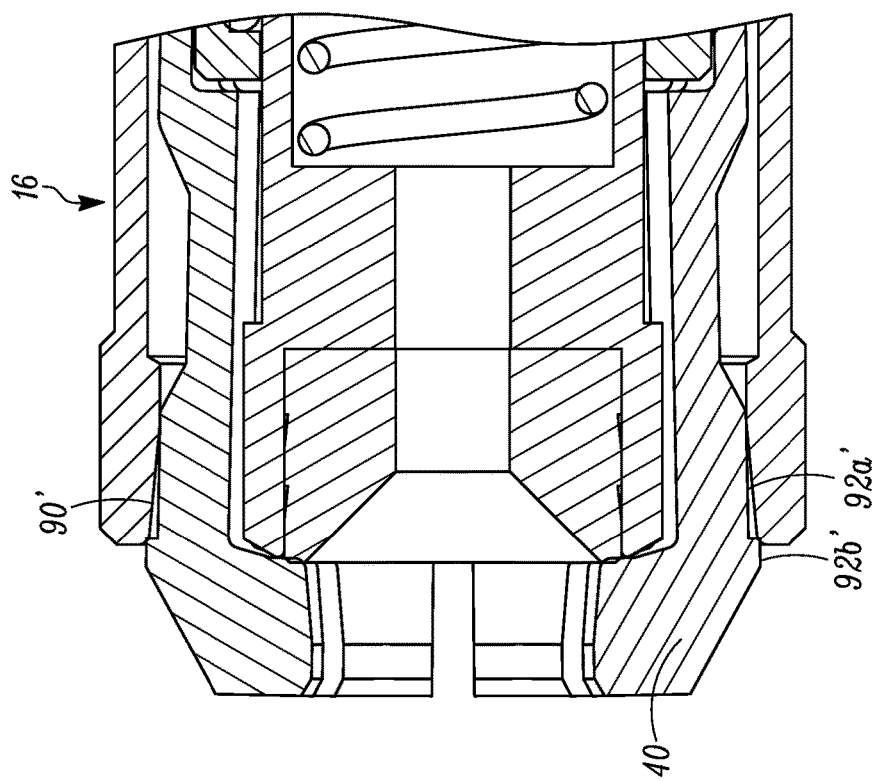
FIG. 9 is a cross-sectional view similar to FIGS. 6-8 but with the engagement surfaces of the collets and the sleeve reversed.

The collets 40 have been described as having the shallow angled exterior surface 90, while the interior surface of the sleeve 16 is described as having the two or more actuation surfaces or steps 92a, 92b having different inside diameters. In another embodiment illustrated in FIG. 9, the surfaces can be reversed, with the interior surface of the sleeve 16 having a shallow angled exterior surface 90', similar to the surface 90, and the exterior surface of each of the collets 40 having two or more actuation surfaces 92a', 92b', similar to the actuation surfaces 92a, 92b, with different outside diameters.

Figure 10:
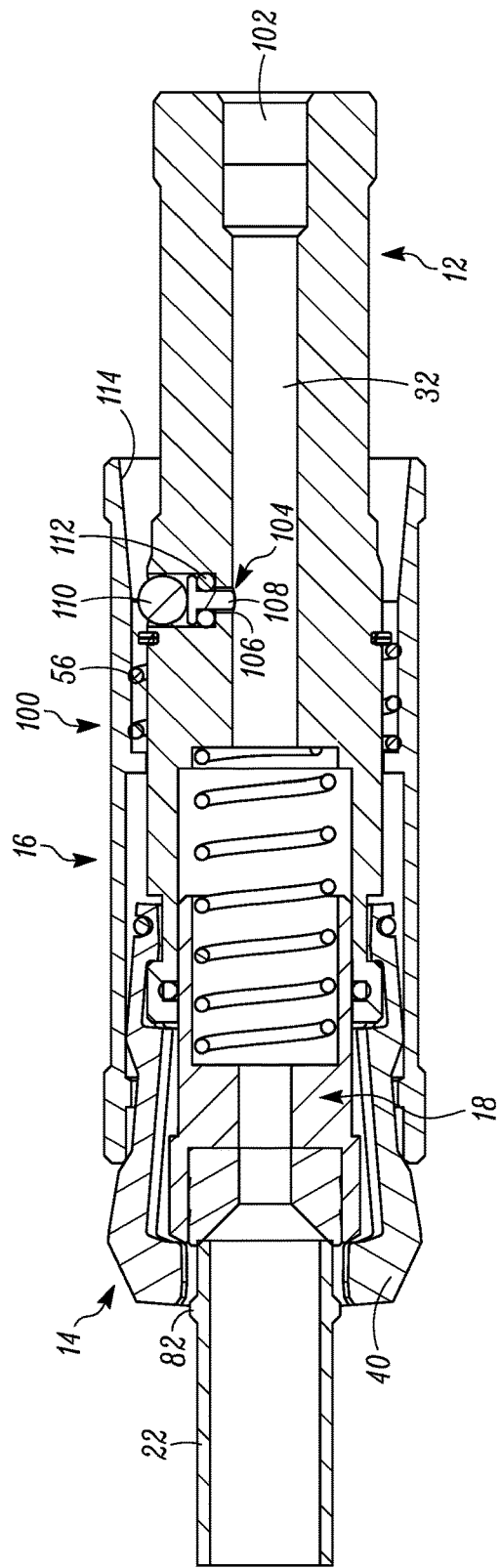
FIG. 10 is a longitudinal cross-sectional view of another embodiment of a fluid connector prior to connecting to a tube, with the fluid connector including a pressure driven actuation resistance mechanism.
Figure 11:
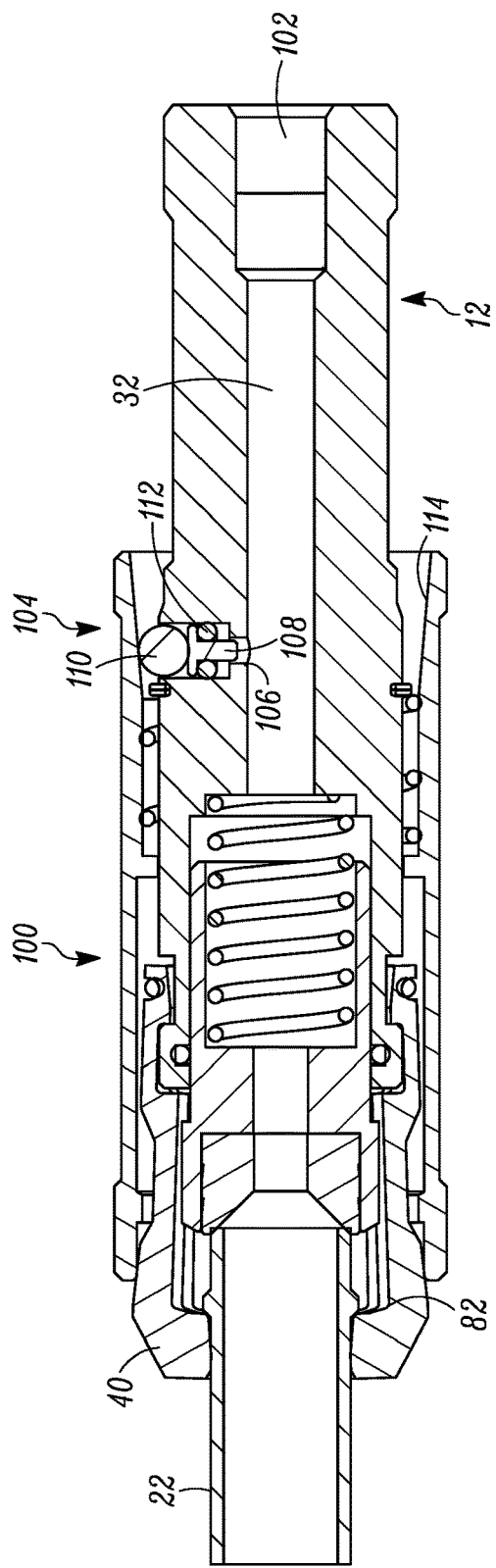
FIG. 11 is a longitudinal cross-sectional view similar to FIG. 10 but with the fluid connector connected to the tube and the pressure driven actuation resistance mechanism engaged with the sleeve.

FIGS. 10 and 11 illustrate an embodiment where a fluid connector 100 is shown being attached to the tube 22 with the protruding feature 82. The fluid connector 100 is substantially identical in construction to the fluid connector 10 and similar elements are called out using the same reference numerals. In this example, the fluid connector 100 is a generally cylindrical construction that includes the body 12, the collet assembly 14, the sleeve 16, and the piston 18. The fluid connector 100 can be used to, for example, connect a first fluid system with a second fluid system for transferring fluids, including gaseous or liquid fluids, between the first and second fluid systems, or the fluid connector 100 can connect to a fluid system for sealing the fluid system using the fluid connector 100.

With the fluid connector 100, instead of the body 12 having a radial fluid opening 20 as in the fluid connector 10, the body 12 of the fluid connector 100 has a fluid opening 102 that extends axially through the second end of the body 12. In some embodiments, the fluid opening 102 could be plugged if the fluid connector 100 is used to seal a fluid system.

The fluid connector 100 also differs from the fluid connector 10 in that the fluid connector 100 includes a pressure driven actuation resistance mechanism 104 to help prevent the sleeve 16 from being pushed backward by fluid pressure acting on the collets 40 to a retracted position against the bias of the sleeve spring 56. A similar pressure driven actuation resistance mechanism 104 could be used on any one of the fluid connectors 10 in FIGS. 1-9. The pressure driven actuation resistance mechanism 104 is configured to generate an actuation resistance force on the interior surface of the sleeve 16, with the amount of actuation resistance force varying based on the pressure of the fluid internal to the fluid connector 100. As the fluid pressure internal to the fluid connector 100 increases, more force is exerted on the collets 40 which push outward against the sleeve 16 tending to push the sleeve 16 open to the retracted position. However, as the fluid pressure increases, the actuation resistance force generated by the pressure driven actuation resistance mechanism 104 on the sleeve 16 is increased thereby counteracting the force of the collets 40 on the sleeve. Likewise, as the fluid pressure decreases, the actuation resistance force generated by the pressure driven actuation resistance mechanism 104 on the sleeve 16 is also decreased.

Referring to FIGS. 10 and 11, the pressure driven actuation resistance mechanism 104 includes a channel 106 that is in fluid communication with the fluid flow channel 32 of the body 12. A pressure piston 108 is disposed in the channel 106, and a ball 110 is disposed in the channel 106 above the pressure piston 108. An o-ring seal 112 provides a seal between a stem of the pressure piston 108 and the channel 106 to prevent escape of fluid flowing through the fluid flow channel 32.

With reference to FIG. 10, with the fluid connector 100 not attached and there is no fluid pressure internal to the fluid connector 100, when the sleeve 16 is retracted the ball 110 is pushed inwardly. With reference to FIG. 11, once attachment is made and the fluid connector 100 has internal pressure, the ball 110 is pushed radially outward against an angled interior ramp surface 114 of the sleeve 16 by the pressure piston 108 and the fluid acting on the end of the pressure piston 108 via the channel 106. The ball 110 creates an actuation resistance force on the sleeve 16 which resists movement of the sleeve 16 to a disconnected position.

As described above, when the connector 100 has internal pressure, the fluid acts on the piston 18 which directly acts upon the collets 40, forcing the collets 40 outward which, due to the relatively shallow angle of the collet surfaces 90, creates an axial force on the sleeve 16 tending to force the sleeve 16 backward to the retracted position. The axial force on the sleeve 16 is translated into a radial force on the ball 110 via the angled interior ramp surface 114 of the sleeve 16. That radial force is pushing directly against the outward force acting on the pressure piston 108 by the fluid pressure internal to the fluid connector 100. The two opposing forces should counteract one another to a sufficient extent to prevent a pressure induced retraction of the sleeve 16 when the fluid connector 100 is pressurized. In one embodiment, the two opposing forces can be generally equal to each other.

With the described pressure driven actuation resistance mechanism 104, no spring, elastic element or other biasing element acts on the ball 110 that biases the ball 110 downward to the position shown in FIG. 10. Instead, the angled ramp surface 114 on the interior of the sleeve 16 forces the ball downward when the fluid connector 100 is not pressurized and the sleeve 16 is pulled back to the retracted position.

Although the pressure driven actuation resistance mechanism 104 has been described as having a ball 110, other actuation resistance force producing elements can be used. Any element, such as a ball, a cylinder, or the like, can be used as long as the element can create sufficient actuation resistance force on the sleeve 16 and that permits the element to roll or slide along the ramp surface 114 when the sleeve 16 is retracted. In addition, the pressure piston 108 and the ball 110 need not be separate elements but could instead form a single piece that performs the functions of both the pressure piston and the ball.

In addition, any of the individual features of the fluid connectors in FIGS. 1-11 can be used together in any combination thereof.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A self-adjusting fluid connector, comprising:
a generally cylindrical construction that includes a body, a collet assembly with a plurality of collets, a sleeve, a piston, and a longitudinal axis;
the plurality of collets are pivotally supported at an end of the body for pivoting movement between an expanded position and a collapsed position;
the sleeve surrounds the body, the collet assembly, and the piston; the sleeve is slidable relative to the plurality of collets and the body in a direction parallel to the longitudinal axis between a default position and a retracted position where the plurality of collets are in the collapsed position when the sleeve is at the default position and the plurality of collets are in the expanded position when the sleeve is at the retracted position; and the sleeve is biased by a spring toward the default position;
the piston is slideably disposed within the body and the plurality of collets for sliding movement relative thereto in a direction parallel to the longitudinal axis; the piston is biased by a spring in a direction away from the body in a direction parallel to the longitudinal axis;
an interface between an exterior surface of each of the collets and an interior surface of the sleeve, the interface controls movements of the collets between the expanded position and the collapsed position;
the interface between the collets and the sleeve includes:
each of the collets includes an angled exterior surface with a shallow angle, and the sleeve includes an interior surface with at least two actuation surfaces that are engageable with the angled exterior surfaces of the collets, the at least two actuation surfaces having different constant inside diameters; or the sleeve includes an angled interior surface with a shallow angle, and each of the collets includes an exterior surface with at least two actuation surfaces that are engageable with the angled interior surface of the sleeve, the at least two actuation surfaces having different constant outside diameters;

wherein the interface between the exterior surface of the collets and the interior surface of the sleeve permits the collets to self-adjust to different collapsed positions around different diameters of tubes.

2. The self-adjusting fluid connector of claim 1, wherein the shallow angle is about 4 degrees to about 10 degrees.

3. The self-adjusting fluid connector of claim 2, wherein a friction force is generated between the interface between the collets and the sleeve; and the friction force together with a biasing force of the spring acting on the sleeve is equal to or greater than a push back force that acts on the sleeve in a direction toward the retracted position that is created when the self-adjusting fluid connector is pressurized and the shallow angle A is about 4 degrees to about 10 degrees.

4. The self-adjusting fluid connector of claim 1, further comprising a main seal disposed within an end of the piston.

5. The self-adjusting fluid connector of claim 4, wherein the main seal has an inverted cone shape with an inwardly and rearwardly sloping sealing surface.

6. The self-adjusting fluid connector of claim 1, further comprising a pressure driven actuation resistance mechanism that is engageable with an interior surface of the sleeve when the fluid connector is pressurized with a pressurized fluid.

7. The self-adjusting fluid connector of claim 6, wherein the pressure driven actuation resistance mechanism is connected to the body and is in fluid communication with a pressurized fluid flow channel in the body.

8. A fluid connector, comprising:
a generally cylindrical construction that includes a body, a collet assembly with a plurality of collets, a sleeve, a piston, and a longitudinal axis;
the plurality of collets are pivotally supported at an end of the body for pivoting movement between an expanded position and a collapsed position;
the sleeve surrounds the body, the collet assembly, and the piston; the sleeve is slidable relative to the plurality of collets and the body in a direction parallel to the longitudinal axis between a default position and a retracted position where the plurality of collets are in the collapsed positon when the sleeve is at the default position and the plurality of collets are in the expanded position when the sleeve is at the retracted position; and the sleeve is biased by a spring toward the default position;
the piston is slideably disposed within the body and the plurality of collets for sliding movement relative thereto in a direction parallel to the longitudinal axis; the piston is biased by a spring in a direction away from the body in a direction parallel to the longitudinal axis; and one of the following:
each of the collets includes an angled exterior surface with a shallow angle, and the sleeve includes an interior surface with at least two actuation surfaces that are engageable with the angled exterior surfaces of the collets, the at least two actuation surfaces having different constant inside diameters; or the sleeve includes an angled interior surface with a shallow angle; and each of the collets includes an exterior surface with at least two actuation surfaces that are engageable with the angled interior surface of the sleeve, the at least two actuation surfaces having different constant outside diameters;

wherein at the default position of the sleeve, the sleeve is up and over ends of the plurality collets to force the plurality of collets to the collapsed position; and wherein the sleeve is at the default position when a tube is not inserted into an end of the fluid connector.

9. The fluid connector of claim 8, further comprising a main seal disposed within an end of the piston.

10. The fluid connector of claim 9, wherein the main seal has an inverted cone shape with an inwardly and rearwardly sloping sealing surface.

11. The fluid connector of claim 8, further comprising a pressure driven actuation resistance mechanism that is engageable with an interior surface of the sleeve when the fluid connector is pressurized with a pressurized fluid.

12. The fluid connector of claim 11, wherein the pressure driven actuation resistance mechanism is connected to the body and is in fluid communication with a pressurized fluid flow channel in the body.

13. A fluid connector, comprising:
a generally cylindrical construction that includes a body, a collet assembly with a plurality of collets, a sleeve, a piston, and a longitudinal axis;
the plurality of collets are pivotally supported at an end of the body for pivoting movement between an expanded position and a collapsed position;
the sleeve surrounds the body, the collet assembly, and the piston; the sleeve is slidable relative to the plurality of collets and the body in a direction parallel to the longitudinal axis between a default position and a retracted position where the plurality of collets are in the collapsed positon when the sleeve is at the default position and the plurality of collets are in the expanded position when the sleeve is at the retracted position; and the sleeve is biased by a spring toward the default position;
an interface between the collets and the sleeve that controls movements of the collets between the expanded position and the collapsed position;
the piston is slideably disposed within the body and the plurality of collets for sliding movement relative thereto in a direction parallel to the longitudinal axis; the piston is biased by a spring in a direction away from the body in a direction parallel to the longitudinal axis; and
a pressure driven actuation resistance mechanism that is engageable with an interior surface of the sleeve when the fluid connector is pressurized with a pressurized fluid.

14. The fluid connector of claim 13, wherein the pressure driven actuation resistance mechanism is connected to the body and is in fluid communication with a pressurized fluid flow channel in the body.

15. The fluid connector of claim 13, wherein the interior surface of the sleeve that is engageable by the pressure driven actuation resistance mechanism is located adjacent to a first end of the sleeve and the interface is located adjacent to a second end of the sleeve.

* * * * *